No. 772,922. PATENTED OCT. 25, 1904.
J. P. BURGESS.
METHOD OF SEPARATING BUCK AND PLANTAIN SEED FROM CLOVER SEED.
APPLICATION FILED MAY 31, 1904.
NO MODEL.

Witnesses:
E. F. Stewart
R. M. Elliott

Joseph P. Burgess,
Inventor,
by C. A. Snow & Co.
Attorneys.

No. 772,922.

Patented October 25, 1904.

UNITED STATES PATENT OFFICE.

JOSEPH PETER BURGESS, OF MOBERLY, INDIANA.

METHOD OF SEPARATING BUCK AND PLANTAIN SEED FROM CLOVER-SEED.

SPECIFICATION forming part of Letters Patent No. 772,922, dated October 25, 1904.

Application filed May 31, 1904. Serial No. 210,592. (No model.)

*To all whom it may concern:*

Be it known that I, JOSEPH PETER BURGESS, a citizen of the United States, residing at Moberly, in the county of Harrison and State of Indiana, have invented a new and useful Method of Separating Buck and Plantain Seed from Clover-Seed, of which the following is a specification.

This invention relates to a method of separating buck and plantain seed from clover-seed.

The object of the invention is without the the employment of expensive machinery and in a thoroughly practical and certain manner to separate buck and plantain seed from clover-seed.

As is well known, the presence of buck and plantain seeds in clover-seed makes the latter practically valueless to farmers and, moreover, greatly reduces its selling price to seedmen.

The present invention is based upon a discovery, the result of many experiments, of the different absorptive properties of clover and of buck and plantain seed. I have discovered that the halm in clover-seed resists for a much longer time the effects of water than either plantain or buck seeds, the latter being readily responsive to the action of water when placed therein and will swell or expand and by their increased bulk be caused to float, while the clover-seeds remain submerged.

The invention consists, generally stated, in subjecting the three seeds named to successive washings, then to drying, and finally to draining. During the successive washings the buck and plantain seeds swell and float to the surface of the water, the water containing these seeds being poured off and the clover-seed remaining in the vessel. Of course all of the plantain and buck seeds have not the same qualities—that is to say, some will absorb water more readily than others—and it is for this reason that repeated washings are rendered necessary.

In the accompanying drawings, forming a part of this specification, there are illustrated a number of implements which may be used in carrying the method into effect, it being understood that the invention may be otherwise carried out and still be within the scope.

Figures 1, 2:
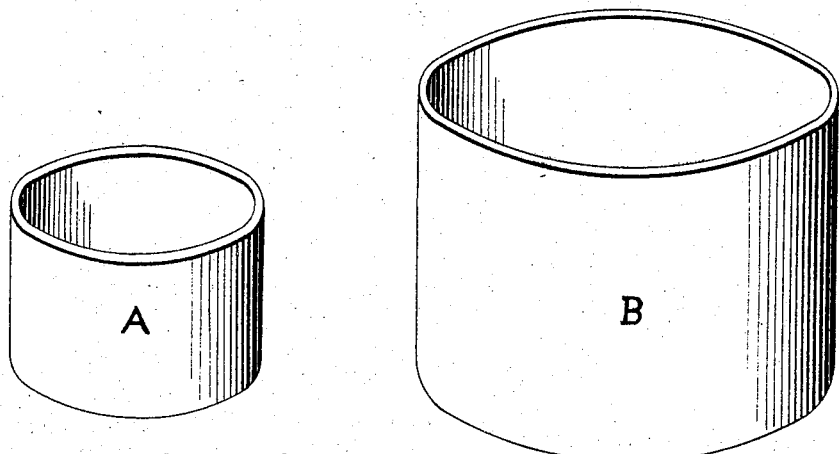
Figures 3, 4:
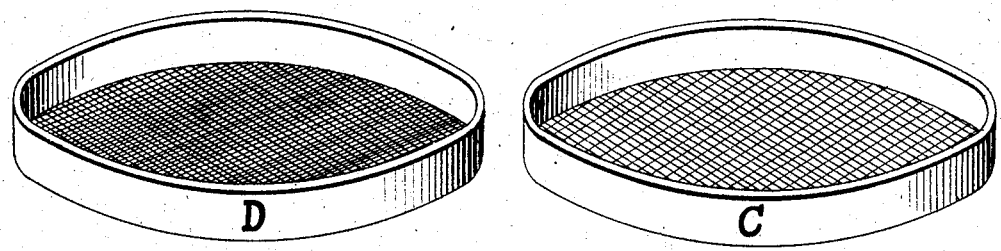
Figure 5:
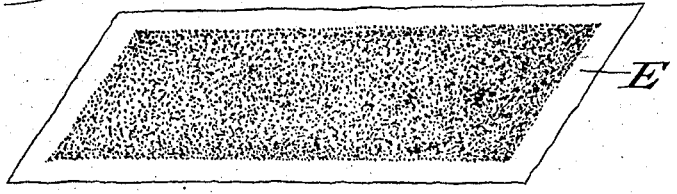

In the drawings, Figure 1 is a view in perspective of a bucket or receptacle in which the seeds are first placed. Fig. 2 is a similar view of another receptacle into which the seeds are deposited after having been washed in the receptacle shown in Fig. 1. Fig. 3 is a perspective detail view of a sieve used in the procedure. Fig. 4 is a similar view of another sieve. Fig. 5 is a perspective view exhibiting one part of the apparatus employed in carrying out the procedure.

In carrying the invention into effect about five quarts of clover-seed with which are mixed buck and plantain seeds are placed in a receptacle A containing four gallons of water. The contents are then stirred rapidly with a paddle, and while the water is still in motion it is poured into the receptacle B. Owing to the fact that the plantain and buck seeds rapidly absorb the water, they are caused thereby to swell and increase in bulk, and thus buoyancy, and float to the surface, so that the greater part of all of the seed that pass to the receptacle B are buck and plantain, the clover-seeds, due to their great specific gravity and relatively non-absorptive qualities, remaining in the bottom of the receptacle A. The receptacle B should be capable of holding about fifteen gallons of water. The receptacle A is again filled with water and the same procedure observed, and this is repeated several times, the last operation removing practically all of the buck and plantain seeds from the clover-seeds in the receptacle A. After the successive washings have been completed the seeds that remain in the receptacle A are emptied upon the screen C, and this is continued until the screen C will have about two bushels therein. The seeds upon the screen C are allowed to remain therein for about ten minutes, or for a period long enough to allow them to drain thoroughly, and they are then emptied upon a sheet of canvas E and leveled off until the mass is about two inches in thickness. The seeds are then allowed to remain for two hours upon the canvas sheet and are then stirred up, so as to bring the under seed to the top, and allowed to stand a further two hours or until dry. To effect the final and complete separation of any buck or plantain seeds that may still remain mixed with the clover-seeds, the mass is taken and passed through the screen D, the meshes of which are of the size of clover-seeds, and all that readily pass through the screen are of course clover-seed, and any that fail readily to pass through may be rubbed with the hand to force them through. The seeds thus treated are again passed through the sieve D, and the method is completed.

In the procedure observed a positive separation of the plantain and buck seeds from the clover-seed is secured, and the clover-seed thus treated will bring four or five times as much as the ordinary clover-seed now upon the market.

Having thus described the invention, what is claimed is—

1. The herein-described method of separating clover-seed from buck and plantain seeds which consists in soaking the seeds until the plantain and buck seeds swell, then draining the seeds, then screening the seeds, then spreading out the seeds in a relatively thin stationary sheet allowing them partially to dry, and finally passing the seeds through a screen, the meshes of which will permit passage of the clover-seed but the retention of the other seeds.

2. The herein-described method of freeing clover-seeds from buck and plantain seeds which consists in subjecting the mixed seeds to a water-bath, then agitating the seeds in the bath, then pouring the seeds while still in motion into a second receptacle, then subjecting the mixed seeds to a screening action, partially drying the seeds while in the screen, then spreading the seeds in a thin stationary sheet, then allowing them to drain, then spreading them in a thin sheet, then agitating the mass to bring the under side to the top, and finally passing the seeds through a screen the meshes of which will allow passage of the clover-seeds, and check the buck and plantain seeds.

In testimony that I claim the foregoing as my own I have hereto affixed my signature in the presence of two witnesses.

JOSEPH PETER BURGESS.

Witnesses:
SAM T. WOLFE,
VICTOR M. BULLEEL.